June 19, 1928.
L. TITUS
1,674,419
CONVEYER AND INSPECTING APPARATUS
Filed June 25, 1924   3 Sheets-Sheet 3
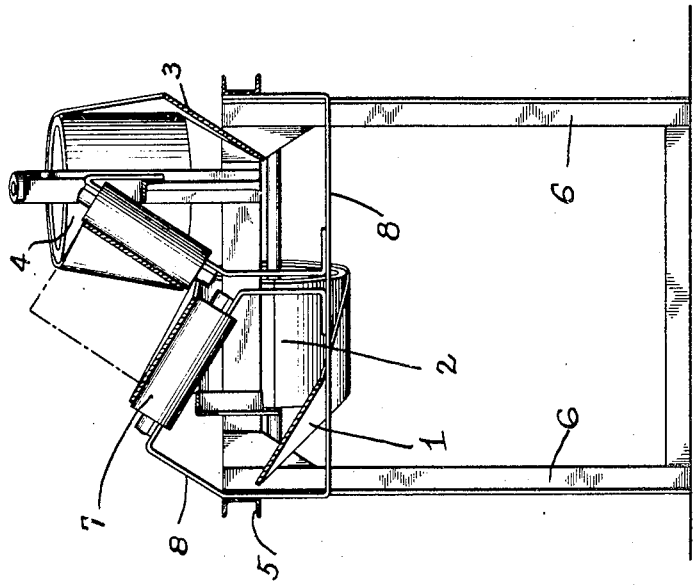
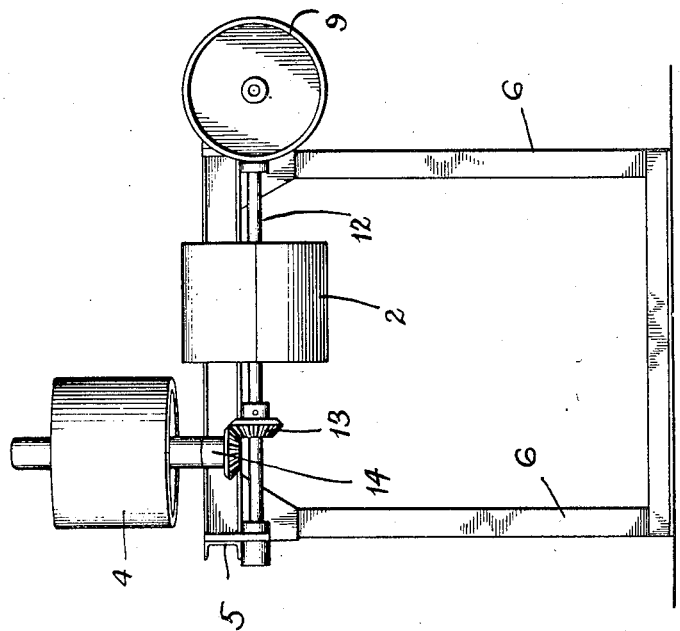

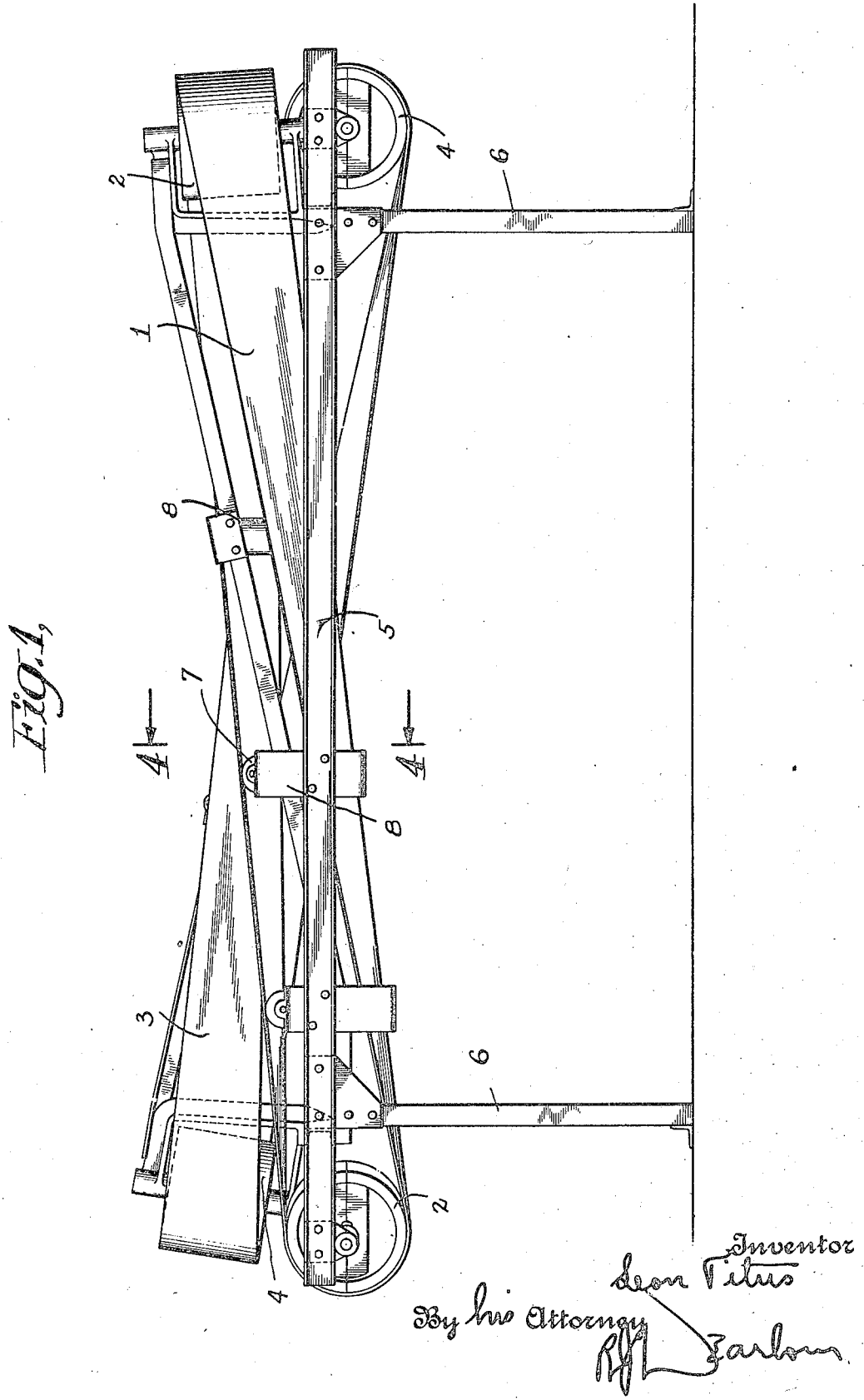

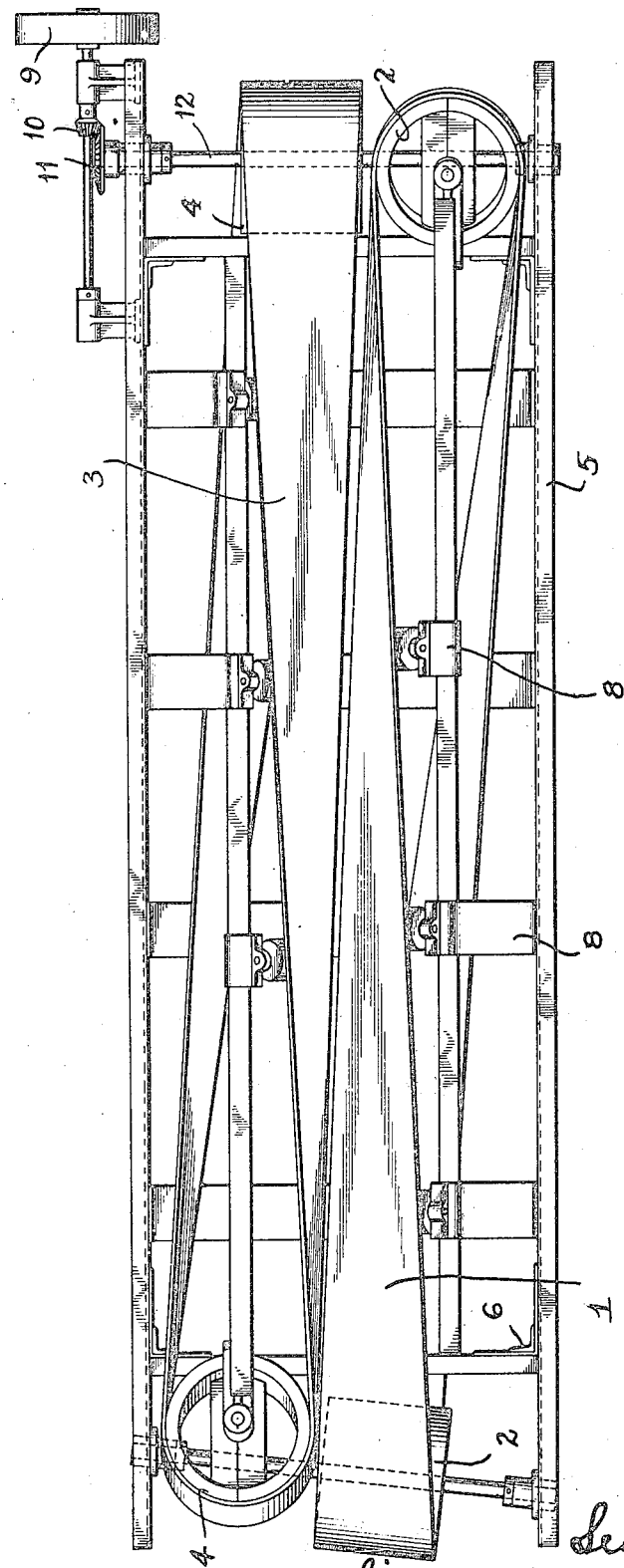

Patented June 19, 1928.

1,674,419

UNITED STATES PATENT OFFICE.

LEON TITUS, OF PORT ARTHUR, TEXAS, ASSIGNOR, BY MESNE ASSIGNMENTS, TO THE TEXAS COMPANY, OF NEW YORK, N. Y., A CORPORATION OF DELAWARE.

CONVEYER AND INSPECTING APPARATUS.

Application filed June 25, 1924. Serial No. 722,193.

This invention relates to conveying apparatus and more particularly to conveying apparatus designed to permit inspection of the articles conveyed.

One object of the invention is to provide an apparatus for conveying articles and at the same time automatically turning them so that they may be inspected on all sides while passing over the apparatus. A further object is to provide an apparatus which will permit thorough inspection and which will act as a link in a conveying system, thus avoiding any loss of time in the movement of the articles on account of inspection.

Additional advantages will appear as developed in the following description and drawings:

The machine consists essentially of two belts spaced relatively close together, one belt capable of receiving articles from a conveyer at the front end of the machine while the other belt may deliver the articles to another conveyer at the other end of the apparatus. Intermediate the ends of the machine the articles are transferred from the first belt to the second belt by a gradual turning of the belts from horizontal and vertical positions, respectively, at one end, to vertical and horizontal positions, respectively, at the other end.

In the drawings Figure 1 is a side elevation of the inspecting apparatus.

Figure 2 represents a plan view of the same.

Figure 3 is an end view of the driving mechanism.

Figure 4 is a cross section through the line 4—4 of Figure 1.

Referring in detail to the drawings, the endless belt 1 passes over pulleys 2 and the endless belt 3 passes over pulleys 4. The pulleys are mounted upon a framework 5 which is supported from the floor by standards 6. The pulleys 2 are mounted substantially at right angles to each other so that the belt 1 in passing from one to the other is turned from vertical to horizontal or vice versa. Pulleys 4 are likewise supported substantially at right angles to each other causing the belt 3 to traverse a course similar to that traversed by belt 1. The pairs of pulleys 2 and 4 are also supported substantially at right angles to each other so that at each end of the machine a pulley 2 is substantially at right angles to a pulley 4. The pairs of pulleys are also mounted relatively close together thus permitting the belts 1 and 3 to cooperate in conveying articles from one end of the machine to the other.

To prevent sagging of the belts between the pulleys, rollers 7 are supported at intervals and at such angles as to correspond to the desired positions of the belts. These rollers are mounted upon the framework 5 by means of suitable brackets 8. It will be seen that the rollers 7 serve to maintain the belts 1 and 3 in about the same angular relation to each other between the pulleys.

The belts 1 and 3 are driven in the same direction and at the same rate from a pulley 9. Belt 3 is driven from pulley 9 through bevel gears 10 and 11, shaft 12 and pulley 4, while shaft 12 is also connected to pulley 2 through bevel gears 13 and 14 to drive belt 1. The pulley 9 may be operatively connected to any suitable source of power. In place of the belts 1 and 3 I may make use of any other continuous carrier which may prove to be suitable in performing their functions.

The operation of the mechanism is as follows:

Considering the right hand end of the machine as the receiving end, articles are passed to the belt 3 either from another cooperating conveyer or by hand and are carried along on belt 3 until the angle of this belt is raised sufficiently to throw the burden of the articles to belt 1 which then carries them the remainder of the distance to an adjoining conveyer. It will be seen, therefore, that in passing from one end of the machine to the other that the articles carried over it are gradually turned through an angle of about 90 degrees without jarring them or causing other detrimental effects and at the same time the operator may make a careful inspection of all sides of the articles, eliminating or marking any which show defects.

I have found my invention to be particularly well adapted to facilitate the inspection of cans filled with oil or other liquid. The usual five gallon can for oil has a square top and bottom, the sides being at right angles to each other and to the top and bottom.

Such cans are filled with oil and sealed by a machine designed for that purpose and then passed from this machine by a conveyer to the inspection machine. The cans are delivered to the inspection machine preferably in upright position and as they pass over the machine they are turned upon one side, causing the oil to come against the top and the newly made seal. Thus if any seals are found to be faulty, as evidenced by the oil leaking out, such cans may be removed to be re-sealed; also defects in other parts of the cans may be observed at the same time. By the provision of cleats or other suitable devices on the belts, articles having shapes other than the cans described may be turned and inspected with equal facility.

The present embodiment of the invention is intended to be used as one of the units of a conveying system by receiving articles to be inspected from an adjoining conveyer and depositing the articles at the other end of the machine upon another adjoining conveyer, thus saving any handling or loss of time due to inspection. It will be clear, however, that the machine may be used in any situation of which its construction will permit and that other loading and receiving means may be employed instead of the adjoining conveyers mentioned. Although I have described my invention as applied to the turning and inspecting of a certain type of can, I desire to be limited only as indicated in the appended claims.

What I claim is:

1. An article inspecting apparatus comprising two belts spaced relatively close together, one belt being in a vertical position at one end of the effective length thereof, the other belt being in a horizontal position at the corresponding end, the two belts being in the reverse positions respectively at the other end of the effective length, and means for driving said belts.

2. In an article inspecting apparatus, two continuous carriers mounted in planes which are at a selected angle to each other throughout their effective surfaces but travel in continuously shifting planes, which move gradually through an angle sufficient to expose first one surface and then another of a prismatic body, and means for operating said carriers.

3. In an article inspecting apparatus, two continuous carriers mounted in planes which are at a selected angle to each other throughout their effective surfaces but travel in continuously shifting planes which move gradually through an angle of about 90 degrees, and means for operating said carriers.

4. In an article inspecting apparatus, a support, a pair of pulleys, one mounted at each end thereof, whose axes are at a substantial angle to each other, an endless belt for operation over said pulleys, a second pair of pulleys mounted in the same relation to each other as said first pair, an endless belt for operation over the second pair, the pairs of pulleys being mounted on the support substantially at right angles to each other.

5. An article inspecting apparatus comprising a support, a pair of pulleys disposed at each end of the support with one of the pulleys of each pair disposed in a horizontal plane and the other in vertical plane, and a pair of belts severally mounted on the vertically disposed pulley at one end of the support and on the horizontally disposed pulley at the opposite end of the support.

In witness whereof I have hereunto set my hand this 18th day of June, 1924.

LEON TITUS.